United States Patent
Subrahmanya

(10) Patent No.: US 6,807,429 B2
(45) Date of Patent: Oct. 19, 2004

(54) METHOD AND APPARATUS FOR COMBINING POWER CONTROL COMMANDS RECEIVED IN A WIRELESS COMMUNICATION SYSTEM

(75) Inventor: Parvathanathan Subrahmanya, Sunnyvale, CA (US)

(73) Assignee: Qualcomm Incorporated, San Diego, CA (US)

(*) Notice: Subject to any disclaimer, the term of this patent is extended or adjusted under 35 U.S.C. 154(b) by 305 days.

(21) Appl. No.: 09/935,525

(22) Filed: Aug. 22, 2001

(65) Prior Publication Data

US 2003/0045318 A1 Mar. 6, 2003

(51) Int. Cl.[7] .................................................. H04Q 7/20
(52) U.S. Cl. ....................... 455/522; 455/442; 455/69; 370/335
(58) Field of Search ............................... 455/522, 442, 455/69; 370/335, 331, 332, 333, 334

(56) References Cited

U.S. PATENT DOCUMENTS 6,269,239 B1    7/2001   Hashem et al. ............... 455/69

FOREIGN PATENT DOCUMENTS

| EP | 0975185 | 1/2000 | |
|----|---------|--------|---|
| WO | WO 200036762 A1 * | 6/2000 | ........... H04B/7/005 |
| WO | 0049728 | 8/2000 | |
| WO | 0074247 | 12/2000 | |

* cited by examiner

Primary Examiner—Philip Sobutka
(74) Attorney, Agent, or Firm—Philip R. Wadsworth; Charles D Brown; Timothy F. Loomis

(57) ABSTRACT

Techniques to combine soft-decision power control symbols received for multiple active base stations. In one method, a received signal is initially processed to derive soft-decision (multi-bit valued) symbols for power control commands transmitted from a number of base stations. Each soft-decision symbol for each base station is then scaled based on a scaling factor associated with the base station and which is related to the received signal quality for the power control symbols for the base station. The scaling allows power control symbols for more reliably received base stations to be given greater weights. The scaled soft-decision symbols for each power control period are then combined to provide a decision metric for the period. Each decision metric is then compared against a particular threshold, and a power control decision is derived for each decision metric based on the result of the comparison.

20 Claims, 4 Drawing Sheets

METHOD AND APPARATUS FOR COMBINING POWER CONTROL COMMANDS RECEIVED IN A WIRELESS COMMUNICATION SYSTEM

BACKGROUND

1. Field

The present invention relates generally to data communication, and more particularly to novel and improved techniques for combining power control commands received in a wireless communication system.

2. Background

In a wireless communication system, a user with a terminal (e.g., a cellular phone) communicates with another user via transmissions on the forward and reverse links with one or more base stations. The forward link (or downlink) refers to transmission from the base station to the terminal, and the reverse link (or uplink) refers to transmission from the terminal to the base station. The forward and reverse links are typically allocated different frequency bands.

In a Code Division Multiple Access (CDMA) system, the reverse link transmissions from a number of active terminals may be received concurrently at each base station. Since these transmissions occur over a shared frequency band, the transmission from each active terminal acts as interference to the transmissions from the other active terminals. For each received terminal, the interference due to the total received power from the other transmitting terminals degrades this terminal's received signal quality, which is typically quantified by a signal-to-total-noise-plus-interference ratio (SNR). Since a certain minimum SNR needs to be maintained for each active terminal to provide the desired level of performance, the total interference from all transmitting terminals is typically indicative of the total capacity of the reverse link.

To maximize the reverse link capacity, the transmit power of each active terminal is typically controlled by a respective first (inner) power control loop such that the signal quality of the reverse link transmission received at the base station from this terminal is maintained at a particular target SNR. This target SNR is often referred to as the power control setpoint (or simply, the setpoint). A second (outer) power control loop is typically employed to adjust the setpoint such that the desired level of performance is maintained. This level of performance is typically quantified by a particular frame, packet, block, or bit error rate (FER, PER, BLER, or BER, respectively). The reverse link power control mechanism thus attempts to reduce power consumption and interference while maintaining the desired link performance for the active terminals. This results in increased system capacity and reduced delays in serving users.

Many CDMA systems support soft handoff (or soft handover) on the reverse link whereby a data transmission from an active terminal may be concurrently received by multiple base stations. Reception of the reverse link transmission via multiple signal paths provides diversity against deleterious path effects such as fading and multipaths. Soft handoff may thus improve the quality and reliability of the reverse link transmission (e.g., higher received signal quality if the transmissions received by multiple base stations are combined, and lower probability of dropped calls).

While a terminal is in soft handoff with a set of base stations, an inner power control loop is typically maintained by each base station in the active set to direct the terminal to adjust its transmit power. Conventionally, each base station determines the received signal quality for the terminal (e.g., by processing a pilot transmitted by the terminal), derives power control commands based on the received signal quality, and transmits the power control commands to the terminal. Each power control command directs the terminal to adjust its transmit power either up or down by some amount. Since each base station typically receives the reverse link transmission at a different signal quality, the power control commands from the base stations are not necessarily the same.

Conventionally, the terminal receives the power control commands from the base stations in the active set and compares each received command against a particular threshold to detect whether it is an UP command for a transmit power increase or a DOWN command for a transmit power decrease. The terminal then conventionally applies the "OR-of-the-downs" rule for the power control commands detected in each power control period, and adjusts its transmit power downward if any of the detected command directs the terminal to decrease its transmit power. Using this rule, if the received power control commands from any of the base stations are totally unreliable, the terminal would essentially reduce its transmit power half of the time regardless of the commands received from the more reliable base stations. Since this effect is not desirable, a further requirement is often imposed such that if any base station's received power control command is deemed unreliable, it is excluded for the purposes of deriving the final power control decision. One way to accomplish this is by comparing each base station's received signal strength (e.g., pilot power) against a "power lock" threshold and discarding the received power control commands from each base station having received signal strength that falls below this threshold.

The conventional technique for combining power control commands received from multiple base stations is sub-optimal for several reasons. First, the terminal may erroneously receive DOWN commands from a marginally reliable base station that passes the power lock threshold, and these erroneous commands would then cause the final power control decision to be DOWN regardless of the other received commands from more reliable base stations. Second, incremental information from weak base stations that failed the power lock threshold is discarded and not used to derive the power control decision.

As can be seen, techniques that can be used to more "optimally" combine received power control commands to improve reliability and system performance are highly desirable.

SUMMARY

Aspects of the invention provide techniques to more effectively combine power control commands received from multiple active base stations. In an aspect, "soft-decision" power control symbols for a number of active base stations in each power control period are combined to provide a single power control decision having improved quality. Each soft-decision power control symbol is a multi-bit value that is representative of a transmitted hard-decision (i.e., binary) power control command that has been distorted by channel and processing noise. In another aspect, the soft-decision power control symbols for the active base stations are scaled by their associated scaling factors prior to being combined. The scaling factor for each base station is related to the received signal quality for the base station, and the scaling allows power control symbols from better-received base stations to be given greater weights.

A specific embodiment of the invention provides a method for deriving power control decisions (e.g., for a reverse link transmission) in a wireless (e.g., CDMA) communication system. In accordance with the method, a received signal is initially processed to derive soft-decision symbols for power control commands transmitted from a number of transmission sources (e.g., base stations). Each soft-decision symbol for each base station is then scaled based on a scaling factor associated with the base station. The scaled soft-decision symbols for each power control period are then combined to provide a (decision) metric for the period. Each decision metric is then compared against a particular threshold, and a power control decision is derived for each decision metric based on the result of the comparison.

The soft-decision power control symbol combining techniques described herein may be used for various wireless communication systems (e.g., IS-95, cdma2000 and W-CDMA systems). These techniques may also be advantageously used in the forward and/or reverse links. Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
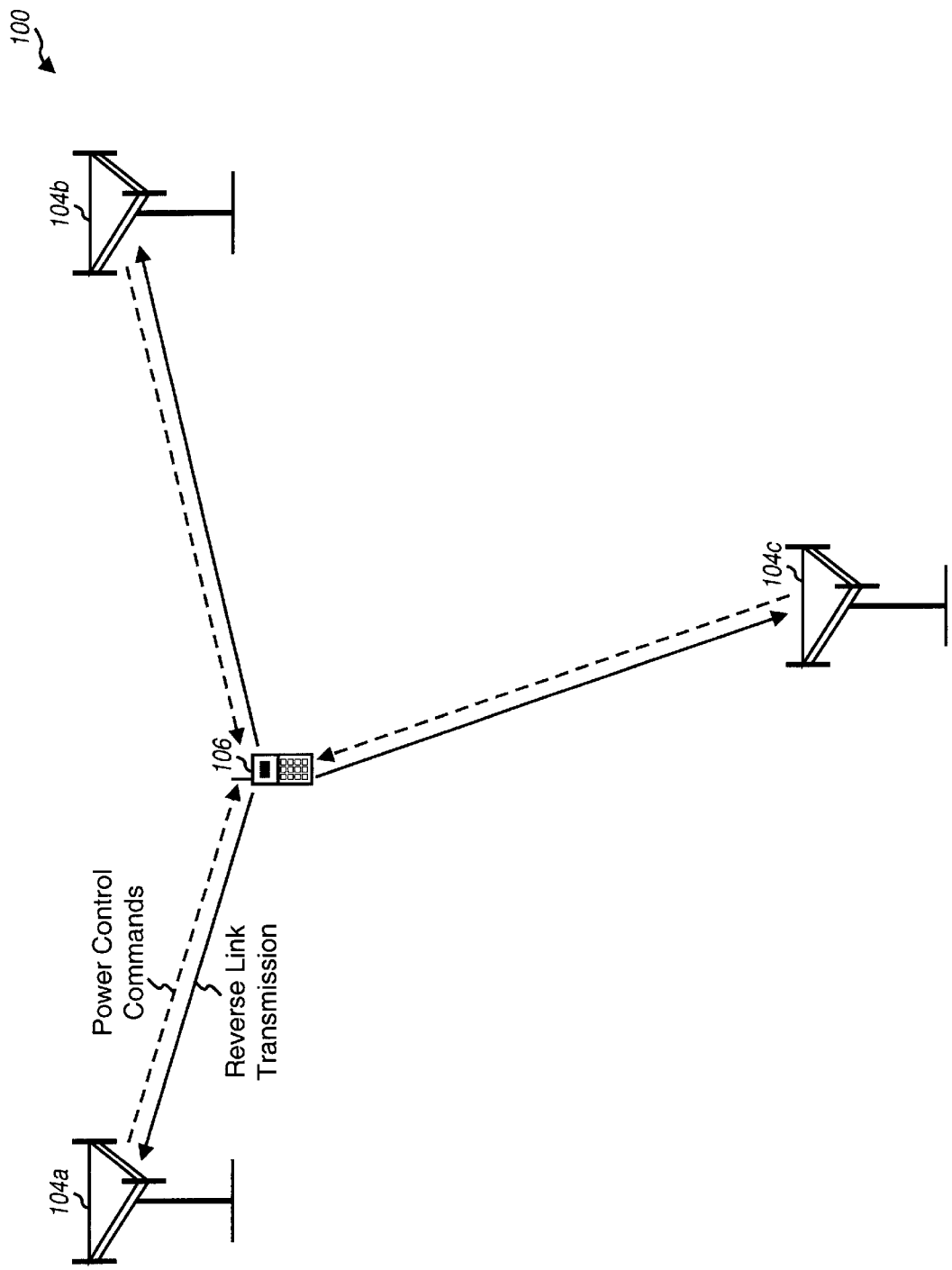
FIG. 1 is a diagram of a wireless communication system wherein various aspects and embodiments of the invention may be implemented.

FIG. 1 is a diagram of a wireless communication system 100 that supports a number of users and is capable of implementing various aspects and embodiments of the invention. System 100 includes a number of base stations 104 that provide coverage for their respective geographic regions (only three base stations are shown in FIG. 1 for simplicity). A base station is also commonly referred to as a base transceiver system (BTS) or an access point, and a base station and/or its coverage area are often referred to as a "cell". System 100 may be designed to implement any combination of one or more CDMA standards such as IS-95, cdma2000, W-CDMA, IS-856, and other standards.

Various terminals 106 are typically dispersed throughout the system (only one terminal is shown in FIG. 1 for simplicity). A terminal may also be referred to as a user equipment (UE), a mobile station, or an access terminal. Each terminal may communicate with one or more base stations on the forward and reverse links at any given moment, depending on whether or not the terminal is active and whether or not it is in soft handoff. In the example shown in FIG. 1, terminal 106 is located in the coverage areas of base stations 104a, 104b, and 104c and is in soft handoff with these base stations.

In a CDMA system, the reverse link transmissions from all active terminals may occur over the same frequency band. In this case, the reverse link transmission from each active terminal acts as interference to the transmissions from the other active terminals. To minimize interference and increase system capacity on the reverse link, the transmit power of each active terminal is controlled such that a desired level of performance (e.g., one percent frame error rate, or 1% FER) is achieved while minimizing the amount of interference to the other active terminals. This transmit power adjustment is achieved by a power control mechanism maintained for each active terminal, as described below.

As shown in FIG. 1, the reverse link transmission from terminal 106 may be received by all three base stations 104a, 104b, and 104c, as indicated by the solid lines with arrows at one end. Each base station receives the reverse link transmission from the terminal and sends power control commands on the forward link to direct the terminal to adjust is transmit power, as indicated by the dashed lines with arrows at one end. The terminal receives and combines the power control commands from the base stations and adjusts its transmit power accordingly, as described below.

The inventive techniques to combine received power control commands may be used in various wireless communication systems wherein multiple transmission sources concurrently transmit power control commands to a receiving device. For clarity, various aspects and embodiments of the invention are described specifically for the reverse link in a CDMA system, whereby a terminal is in soft-handoff with a set of base stations that concurrently transmit power control commands to the terminal.

Figure 2:
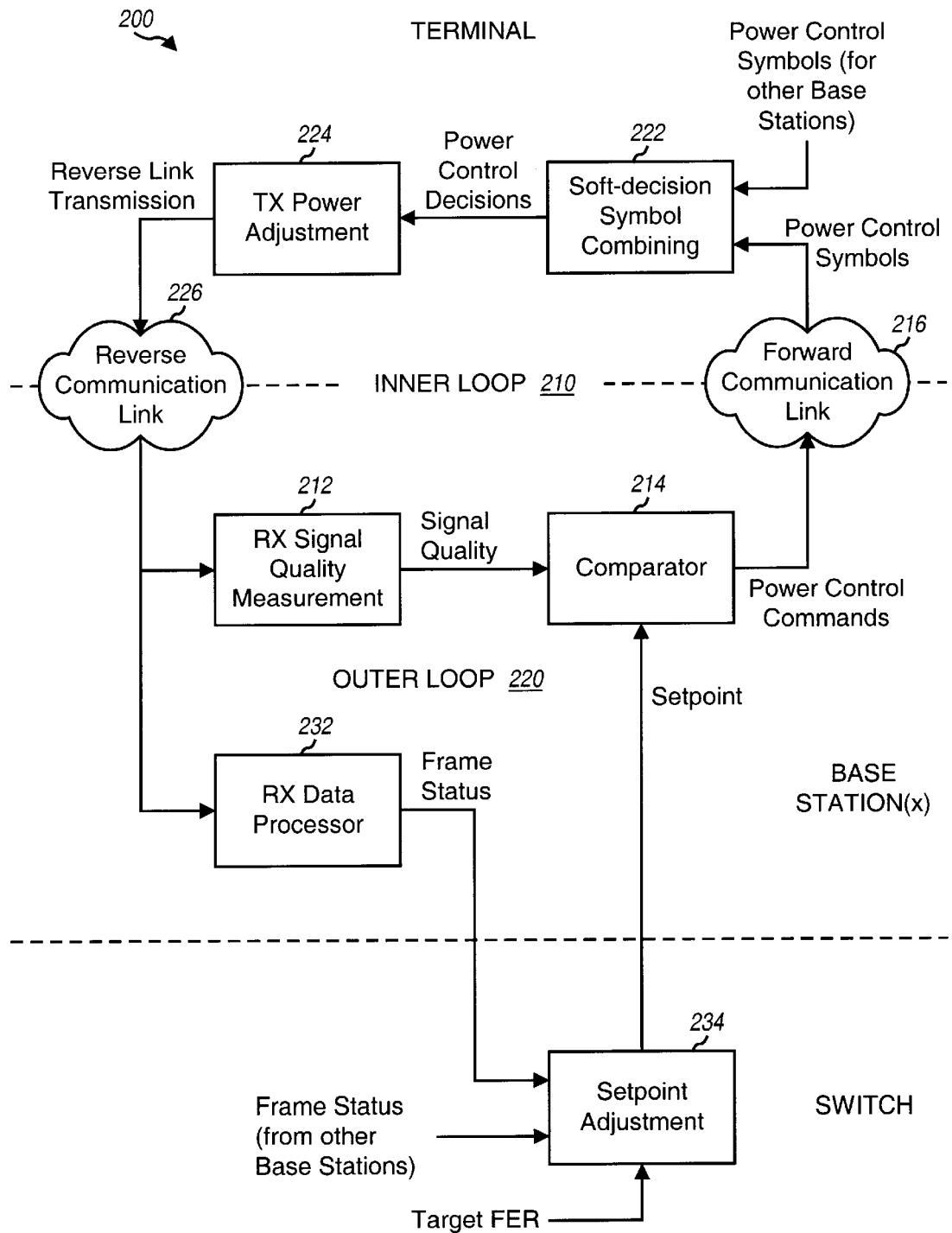
FIG. 2 is a diagram of a reverse link power control mechanism capable of implementing certain aspects and embodiments of the invention.

FIG. 2 is a diagram of a reverse link power control mechanism 200 capable of implementing certain aspects and embodiments of the invention. Power control mechanism 200 includes an inner power control loop 210 that operates in conjunction with an outer power control loop 220. For a terminal in soft handoff and communicating with a set of (active) base stations, a single outer loop 220 may be maintained for the terminal (e.g., by a switch, as described below).

Inner loop 210 is a (relatively) fast loop that may be operated to maintain the signal quality of a reverse link transmission received at each active base station (or just the "best" base station) as close as possible to a target signal-to-total-noise-plus-interference ratio (SNR) (or simply, the setpoint). Inner loop 210 may also be operated to maintain the signal quality of the combined reverse link transmissions received at all active base stations as close as possible to the setpoint.

As shown in FIG. 2, inner loop 210 operates between the terminal and each base station. The power adjustment for inner loop 210 is typically achieved by estimating the signal quality of the reverse link transmission received at the base station (block 212), comparing the received signal quality against the setpoint (block 214), generating power control commands based on the results of the comparison, and sending the power control commands to the terminal via the forward communication link (block 216). The power control commands direct the terminal to adjust its transmit power, and each command may be implemented, for example, as either an UP command to direct an increase in transmit power or a DOWN command to direct a decrease in transmit power.

The terminal receives the forward link transmissions from the active base stations and, for each time interval in which a power control command may be sent (i.e., each power control period), derives a number of power control symbols for a number of power control commands transmitted by the active base stations. Each power control symbol is a soft-decision symbol (i.e., a multi-bit value) for a received power control command. The soft-decision symbol is representative of a hard-decision value (i.e., a binary value, "0" or "1") for a transmitted power control command, which has been distorted by channel and processing noise and other distortions.

The terminal processes and combines the power control symbols received for multiple base stations in each power control period to derive a single power control decision for that period (block 222). The terminal then accordingly adjusts its transmit power for the reverse link transmission based on the power control decision (block 224). For a cdma2000 system, the power control commands may be sent as often as 800 times per second, thus providing a relatively fast response time for inner loop 210.

Due to path loss and fading in the reverse communication link (cloud 226) that typically varies over time, especially for a mobile terminal, the received signal quality at each active base station continually fluctuates. Inner loop 210 thus attempts to maintain the received signal quality at or near the setpoint in the presence of changes in the communication link.

Outer loop 220 is a (relatively) slower loop that continually adjusts the setpoint such that a particular level of performance is achieved for the reverse link transmission from the terminal. The desired level of performance may be a particular target frame, packet, block, or bit error rate (FER, BER, BLER, or BER, respectively). For some CDMA systems, the specified level of performance is 1% FER, although some other target values or some other performance criteria may also be used. Outer loop 220 may be implemented in various manners, some of which are described below.

In a first implementation, a single outer loop 220 is maintained by a switch that coordinates the communication between the terminal and the active base stations. The switch is also referred to as a radio network controller (RNC) in W-CDMA or a selector in IS-95 and cdma2000. For this implementation, the frames received by all active base stations (or nodeBs in W-CDMA) are sent to the switch, which then selects certain frames from among the received frames based on some quality criteria. The setpoint is then adjusted based on the error rate of the selected frames.

In a second implementation, each active base station maintains a separate outer loop 220 for the terminal. For this implementation, the frames received by each active base station are used to adjust the setpoint for the base station.

For clarity, various details are described below for the first implementation wherein the switch maintains a single outer loop 220 for the terminal. For outer loop 220, the reverse link transmission from the terminal is received and processed by each active base station to recover the transmitted frames, and the status of each received frame is determined (block 232). For each received frame, a determination is made whether the frame was decoded correctly (good) or in error (erased) or not transmitted at all. One or more metrics related to the results of the decoding may also be obtained. The status of the decoded frame (either good, erased, or no transmission) and/or possibly other decoding metrics from all active base stations are then sent to the switch.

The switch then selects certain ones of the received frames and adjusts the setpoint accordingly based on the status of the selected frames (and possibly associated decoding metrics) (block 234). Typically, if a frame is decoded correctly, the received signal quality at the base stations is likely to be higher than necessary. The setpoint may then be reduced slightly, which may cause inner loop 210 to reduce the transmit power for the reverse link transmission. Conversely, if a frame is decoded in error, the received signal quality at the base stations is likely to be lower than necessary. The setpoint may then be increased, which may cause inner loop 210 to increase the transmit power for the reverse link transmission. And if the switch detects that no frame was transmitted, the setpoint is not adjusted, unless other information on the potential transmit power level is available.

Conventionally, for the inner power control loop, the terminal determines the received signal strength of each active base station (e.g., based on a pilot transmitted by the base station) and discards the power control symbols received from each base station having a received signal strength below a power-lock threshold. The terminal then converts each retained power control symbol to a hard-decision power control command, applies the "OR-of-the-downs" rule for the power control commands retained in each power control period, and provides a DOWN command as the power control decision if any of the retained power control command is a DOWN command that directs the terminal to decrease its transmit power. The combining is thus performed on hard-decisions, after each retained power control symbol has been converted to either an UP or a DOWN command.

The conventional OR-of-the-downs rule for combining hard-decision power control commands from multiple base stations may provide sub-optimal performance. First, the hard-decision power control command combining does not give deference to more reliably received power control symbols. Moreover, because of the OR property, less reliably received power control commands may be more determinative of the final power control decision.

Aspects of the invention provide techniques to more "optimally" combine power control commands received from multiple base stations. In an aspect, a number of soft-decision power control symbols received for a number of power control commands transmitted from the active base stations in each power control period are combined to provide a single power control decision having improved quality. In another aspect, the power control symbols for the active base stations are scaled by their associated scaling factors prior to being combined. The scaling factor for each base station is proportional to the received signal quality for the base station. The scaling allows power control symbols for more reliably received base stations to be given greater weights.

The soft-decision power control symbol combining techniques described herein may allow a terminal to transmit data reliably using less power on average then conventional technique that relies on hard-decision commands. The techniques of the invention may also allow each base station to transmit the power control commands using less power.

At the terminal, the forward link signals transmitted by the base stations in the terminal's active set are received, conditioned, and digitized to provide (complex-value) samples. The forward link signal transmitted by each base station may comprise power control commands for this terminal, a pilot, and possibly messages and data directed to this and/or some other terminals. The forward link signal transmitted by each base station may further reach the terminal via multiple signal paths, and the received signal at the terminal may include multiple signal instances (or multipaths) received from one or more base stations via multiple signal paths.

A rake receiver is often used to digitally process strong signal instances in the received signal (e.g., those signal instances having signal strength that exceeds a particular detection threshold). The rake receiver typically combines like-kind symbols (e.g., power control symbols) from all processed multipaths for each base station to provide combined symbols having improved quality.

The soft-decision symbols representative of the power control commands transmitted from the base stations in the active set may be expressed as:

$$x_1(k), x_2(k), \ldots x_N(k), \quad \text{Eq (1)}$$

where $x_i(k)$ represents the soft-decision power control symbol for the power control command from the i-th base station in the k-th power control period. N soft-decision symbol streams may thus be derived for N base stations in the terminal's active set.

Each soft-decision symbol, $x_i$, includes a signal component and a noise component and may be expressed as:

$$x_i = \pm m_i + n_i, \quad \text{Eq (2)}$$

where $+m_i$ represents the value for an UP command transmitted by the i-th base station, $-m_i$ represents the value for a DOWN command, and $n_i$ represents the total noise plus interference in the power control symbol for the i-th base station. The total noise plus interference, $n_i$, has a variance of $\sigma_i^2$ and is also assumed to be Gaussian with zero mean. The signal-to-total-noise-plus-interference ratio (SNR) of the power control symbol may then be expressed as:

$$SNR_i = \frac{m_i^2}{\sigma_i^2}. \quad \text{Eq (3)}$$

The probability that an UP command transmitted by the i-th base station is received as the soft-decision symbol, $x_i$, by the terminal may be expressed as:

$$Pr\{x_i \mid UP\} = \frac{1}{\sqrt{2\pi\sigma_i^2}} \cdot e^{-\frac{(x_i - m_i)^2}{2\sigma_i^2}}. \quad \text{Eq (4)}$$

Similarly, the probability that a DOWN command transmitted by the i-th base station is received as the soft-decision symbol, $x_i$, by the terminal may be expressed as:

$$Pr\{x_i \mid DOWN\} = \frac{1}{\sqrt{2\pi\sigma_i^2}} \cdot e^{-\frac{(x_i + m_i)^2}{2\sigma_i^2}}. \quad \text{Eq (5)}$$

If the i-th base station is assumed to be equally likely to transmit an UP command or a DOWN command, then the a posteriori probability that an UP command was transmitted by the i-th base station conditioned on the soft-decision symbol, $x_i$, being received at the terminal may be expressed as:

$$Pr\{UP_i \mid x_i\} = Pr\{\text{the } i\text{th base station sent UP} \mid x_i\}, \quad \text{Eq (6)}$$
$$= \frac{Pr\{x_i \mid UP\}}{Pr\{x_i \mid UP\} + Pr\{x_i \mid DOWN\}},$$
$$= \frac{1}{1 + e^{-\frac{2x_i m_i}{\sigma_i^2}}}.$$

If the power control commands transmitted by all active base stations are reliably received, then the terminal only increases its transmit power if all active base stations transmitted UP commands. And in cases where the power control commands transmitted by the different base stations are not completely reliably received, then the decision to increase or decrease the terminal's transmit power may be based on the a posteriori probability that all base stations transmitted UP commands given the soft-decision symbols received for the base stations. If each active base station's power control command is independent and equally likely to be an UP or a DOWN command, then a decision metric, $L_{lin}$, derived as the a posteriori probability that all active base stations transmitted UP commands for a given power control period, may be expressed as:

$$L_{lin} = Pr\{UP_1, UP_2, \ldots, UP_N \mid x_1, x_2, \ldots, x_N\} \quad \text{Eq (7)}$$
$$= Pr\{UP_1 \mid x_1\} \cdot Pr\{UP_2 \mid x_2\} \cdot \ldots \cdot Pr\{UP_N \mid x_N\}$$
$$= \Pi Pr\{UP_i \mid x_i\}, \text{ for } i = 1 \text{ to } N.$$

To derive the decision metric, $L_{lin}$, the probability of an UP command being transmitted by each base station is initially determined based on the soft-decision symbol, $x_i$, received for the base station, as shown in equation (6). These UP command probabilities are then multiplied together to derive the probability of all base stations having transmitted UP commands, as shown in equation (7).

The decision metric, $L_{lin}$, for each power control period may then be compared against a particular threshold, $Th_{lin}(N)$, to derive a single power control decision that may then be used to adjust the terminal's transmit power. The comparison to derive the power control decision may be expressed as follows:

$$L_{lin} > Th_{lin}(N), \text{ decide UP command},$$
$$L_{lin} \leq Th_{lin}(N), \text{ decide DOWN command}. \quad \text{Eq (8)}$$

As shown in equation (8), if the decision metric, $L_{lin}$, is greater than the threshold, $Th_{lin}(N)$, then it is deemed that all active base stations transmitted UP commands and the terminal's transmit power is increased. Otherwise, if the decision metric, $L_{lin}$, is less than or equal to the threshold, $Th_{lin}(N)$, then it is deemed that at least one active base station transmitted a DOWN command and the terminal's transmit power is decreased.

To simplify the computations for equation (7), the probabilities $Pr\{UP_i|x_i\}$ may be transformed to the log domain, in which case the multiplications would be replaced with more simple additions. The derivation for the log domain is as follows.

Initially, the soft-decision symbol, $x_i$, received in each power control period for each base station may be scaled (or weighted) as follows:

$$y_i = \frac{2x_i m_i}{\sigma_i^2},\qquad \text{Eq (9)}$$

where $y_i$ represents the scaled soft-decision symbol for the i-th base station. As shown in equation (9), the scaling factor (or weight), $g_i$, for the soft-decision symbol, $x_i$, is selected to be related to the quality of the power control commands, as received at the terminal (i.e., $g_i=2m_i|\sigma_i^2$). The scaling factor, $g_i$, may be estimated based on the quality of the power control symbols received at the terminal, as follows:

$$g_i \propto \frac{\sqrt{E_{b,PC}}}{N_t},\qquad \text{Eq (10)}$$

where $E_{b,PC}|N_t$ is the energy-per-bit-to-total-noise-plus-interference ratio for a received power control symbol. For many CDMA systems, the received signal quality for each base station may be more easily estimated based on a pilot transmitted by the base station. In this case, the scaling factor, $g_i$, may be expressed as:

$$g_i \propto \frac{\sqrt{E_{b,pilot}}}{N_t},\qquad \text{Eq (11)}$$

where $E_{b,PC}|N_t$ is the energy-per-bit-to-total-noise-plus-interference ratio for a received pilot symbol. The scaling factor, $g_i$, may also be selected to be related to the signal strength of the forward link (e.g., pilot) transmission received from the base station. The scaling factor may also be implemented in a previous stage of signal processing in the receiver chain. For example, if the received power control symbol for each finger processor is demodulated using a dot/cross product with a common pilot symbol and further scaled by the inverse of the noise received on that finger processor, it has an effect equivalent to multiplying the combined power control symbol by the scaling factor, $g_i$. In general, the scaling factor, $g_i$, for each base station is selected such that the mean of the signal component of $y_i$ is proportional to the $E_{b,PC}|N_t$ of the power control symbols received at the terminal for the base station.

A log-likelihood ratio (LLR), $L_i$, for the scaled soft-decision symbol, $y_i$, may then be expressed as:

$$L_i = \log\left(\frac{1}{1+e^{-y_i}}\right).\qquad \text{Eq (12)}$$

Since $e^{-y_i}$ is positive for all values of $y_i$, the log-likelihood ratio, $L_i$, is a negative value. The log-likelihood ratio, $L_i$, may be obtained via a look-up table that maps various values of $y_i$ to their corresponding LLR values.

A decision metric, $L_{log}$, in the log domain and derived based on the a posteriori probability that all active base stations transmitted UP commands may then be expressed as:

$$L_{log}=L_1+L_2+\ldots+L_N.\qquad \text{Eq (13)}$$

The decision metric, $L_{log}$, is then compared against a (negative) threshold, $Th_{log}(N)$, and the comparison may be expressed as:

$L_{log} > Th_{log}(N)$, decide UP command, $L_{log} \leq Th_{log}(N)$, decide DOWN command. Eq (14)

As shown in equations (8) and (14), the thresholds, $Th_{lin}(N)$ and $Th_{log}(N)$, are each a function of N, which is the number of base stations from which power control commands are received and combined to derive the single power control decision. These thresholds may further be set based on the desired "bias" for the power control mechanism, which may be selected based on two conflicting design goals. First, if the thresholds are set high, then UP transmitted power control commands are more likely to be detected as DOWN commands by the terminal, which would then degrade the signal quality (e.g., poorer voice quality). And second, if the thresholds are set low, then DOWN transmitted power control commands are more likely to be detected as UP commands by the terminal, which would then cause more interference and results in lower system capacity. The specific values to be used for the thresholds may be determined based on various mechanisms such as computer simulation, empirical measurements in the lab or the field, and so on.

The scaling of the soft-decision symbols with scaling factors which are proportional to the received signal quality results in higher quality symbols being given more weight and lower quality symbols being given less weight. As $E_{b,PC}|N_t$ approaches infinity, the soft-decision power control symbol combining techniques approach the "OR-of-the-downs" rule, as described below.

If each of the soft-decision symbols, $x_i$, received for the active base stations is totally reliable, then the SNR for the soft-decision symbol is infinite. The scaled soft-decision symbol, $y_i$, for each power control command will then be either +infinity for an UP command or −infinity for a DOWN command. Equivalently, $L_i=0$ for an UP command and $L_i=$−infinity for a DOWN command. For any finite negative threshold, $Th_{log}(N)$, the final power control decision would be a DOWN command if any base station transmits a DOWN command, since a single DOWN command from one base station would result in −infinity for $L_i$ and thus for $L_{log}$. Thus, for totally reliable soft-decision symbols, $x_i$, the soft-decision symbol combining techniques reduce to the "OR-of-the-downs" rule.

Since the LLRs are all negative values, if any log-likelihood ratio, $L_i$, is less than the threshold, $Th_{log}(N)$, then the terminal's transmit power is reduced. Thus, if a DOWN command is sufficiently reliably received from any single base station, then the terminal's transmit power is reduced. This is a property shared with a conventional algorithm with the power lock threshold.

Figure 3:
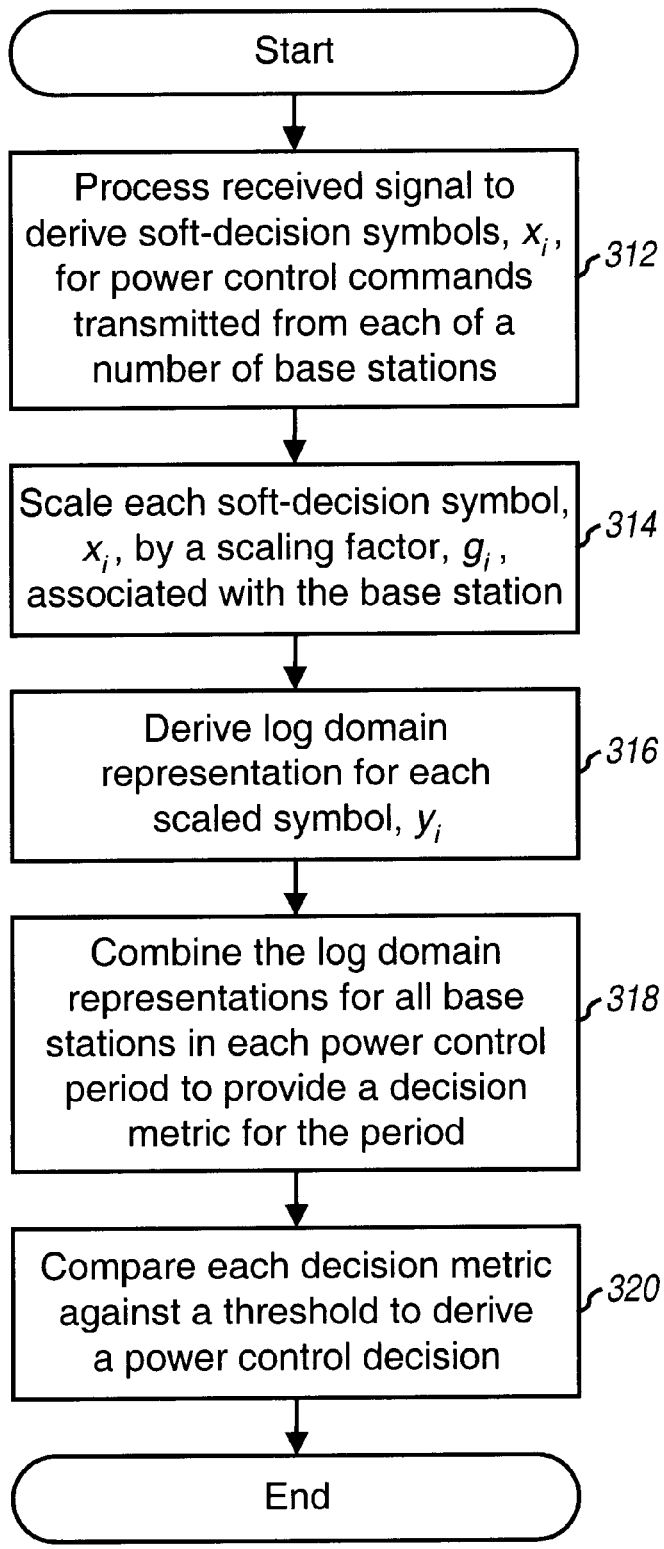
FIG. 3 is a flow diagram of an embodiment of a process to combine soft-decision symbols for power control commands received from multiple base stations.

FIG. 3 is a flow diagram of an embodiment of a process 300 to combine soft-decision symbols for power control commands received from multiple base stations. Initially, the received signal at the terminal is processed to derive soft-decision symbols, $x_i$, for each active base station (e.g., each base station in the terminal's active set), at step 312. A rake receiver may be used to process one or more signal instances for each base station, and to combine the symbols from all processed signal instances for each base station to derive a single stream of soft-decision symbols, $x_i$, for the base station. A number of (N) symbol streams may thus be derived for a number of active base stations.

Each soft-decision symbol, $x_i$, for each base station is then scaled by a scaling factor, $g_i$, associated with that base station, at step 314. The scaling factor, $g_i$, for each base station is selected to be related to the received signal quality for the soft-decision symbols, and may be estimated based on the pilot received from the base station. At any given time, because of fading and possibly other phenomena, the reliability of the power control symbols received for different base stations is typically different. The scaling thus gives more weight to more reliable power control symbols and less weight to less reliable power control symbols.

The scaled soft-decision symbols for all active base stations for each power control period are then combined to derive a decision metric. The soft-decision symbol combining may be achieved in the linear domain or the log domain, as described above.

For soft-decision power control symbol combining in the log domain, a log representation is first derived for each scaled soft-decision symbol, at step 316. The log representation may be the log-likelihood ratio derived as shown in equation (12). The log representations for all active base stations for each power control period are then combined, at step 318. This may be achieved as shown in equation (13). The combined log representation (i.e., the decision metric, $L_{log}$) for each power control period is then compared against the threshold, $Th_{log}(N)$, to derive a single power control decision for that period, at step 320. This comparison may be achieved as shown in equation (14). The power control decision may then be used to adjust the transmit power of the terminal either up or down. The process then terminates.

Figure 4:
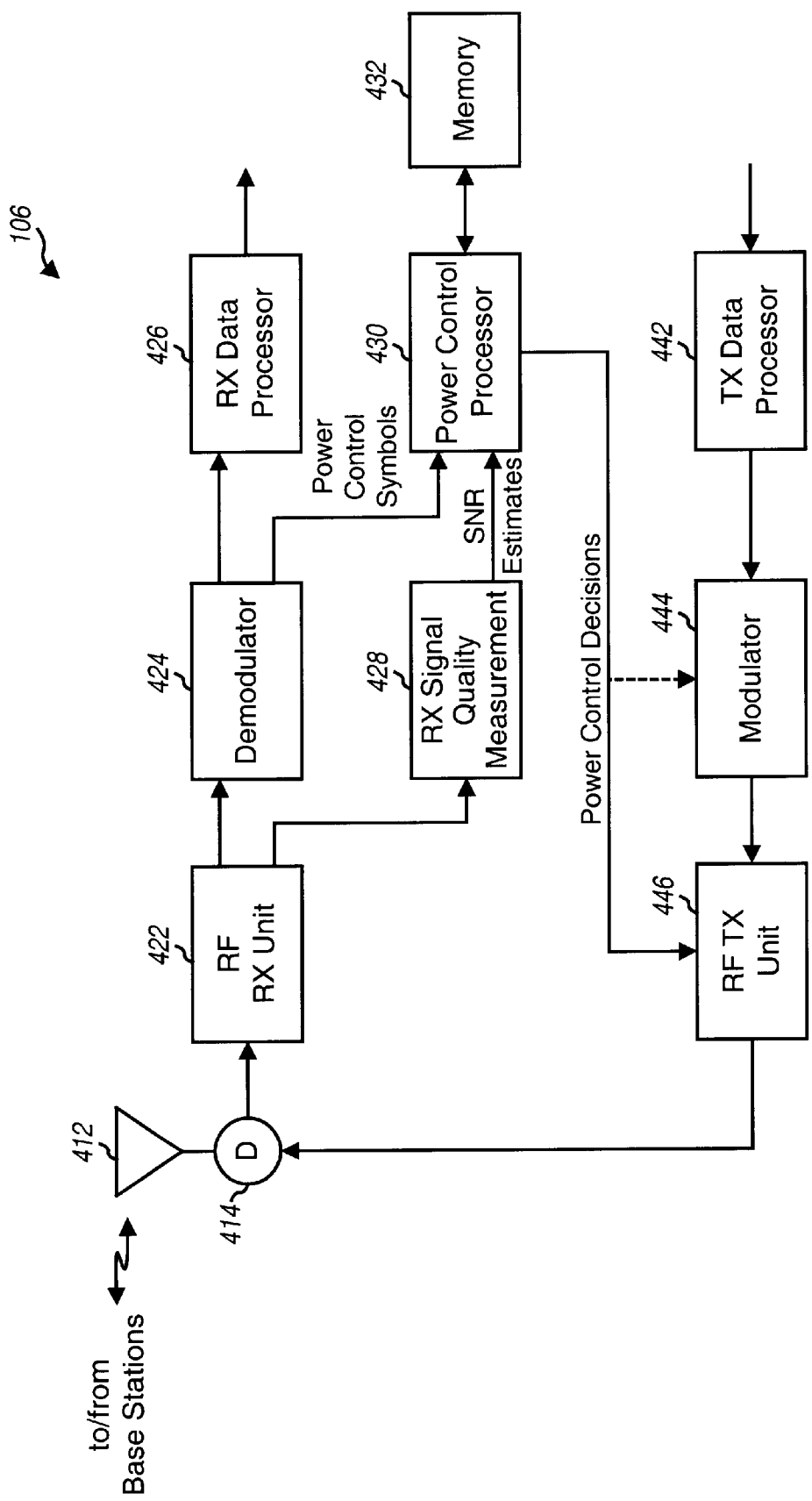
FIG. 4 is a block diagram of an embodiment of a terminal capable of implementing various aspects and embodiments of the invention.

FIG. 4 is a block diagram of an embodiment of terminal 106, which is capable of implementing various aspects and embodiments of the invention. The forward link signals from one or more base stations are received by an antenna 412, routed through a duplexer 414, and provided to an RF receiver unit 422. RF receiver unit 422 conditions (e.g., filters, amplifies, downconverts, and digitizes) the received signal and provides samples. A demodulator 424 receives and processes (e.g., despreads, decovers, and pilot demodulates) the samples to provide recovered symbols. Demodulator 424 may implement a rake receiver that processes multiple signal instances in the received signal and generates recovered symbols for each active base station. Demodulator 424 provides data symbols to a receive (RX) data processor 426, which decodes the data symbols, checks each received frame, and provides the output data. The processing by demodulator 424 and RX data processor 426 is complementary to that performed at the base station.

For the reverse link power control, demodulator 424 provides a power control symbol stream for each active base station. An RX signal quality measurement unit 428 also estimates the signal quality of the power control symbols for each active base station. The signal quality may be estimated based on the power control symbols derived by demodulator 424. Alternatively, the signal quality of the power control symbols may be estimated based on the signal quality of the forward link transmissions received at the terminal. In an embodiment, the forward link quality is estimated based on the SNR of the pilots transmitted by the base stations. The SNR for a forward link transmission may be estimated using various techniques, such as those described in U.S. Pat. Nos. 6,097,972, 5,903,554, 5,056,109, and 5,265,119, all of which are incorporated herein by reference. The SNR estimates for the active base stations are provided to a power control processor 430.

Power control processor 430 receives the power control symbol streams from demodulator 424 and the SNR estimates from measurement unit 428, and scales the power control symbols based on the SNR estimates. Power control processor 430 further combines the scaled power control symbols for each power control period (in the linear or log domain) to derive a decision metric for the period, compares each decision metric against a threshold ($Th_{lin}(N)$ or $Th_{log}(N)$), and provides a power control decision for each decision metric. The power control decisions may be used to adjust the transmit power of the reverse link transmission from the terminal. A memory unit 432 may be used to store data and codes for power control processor 330.

On the reverse link, data is processed (e.g., formatted, encoded) by a transmit (TX) data processor 442, further processed (e.g., covered, spread) by modulator 444, and conditioned (e.g., converted to analog signals, amplified, filtered, and quadrature modulated) by an RF TX unit 446 to generate a reverse link signal. The power control decisions from power control processor 430 may be provided to RF TX unit 446 and used to adjust the transmit power for the reverse link signal. Alternatively or additionally, the power control decisions may be provided to modulator 444 (as shown by the dashed line) and used to scale the data symbols within modulator 444. The reverse link signal is routed from RF TX unit 446 through duplexer 414, and transmitted via antenna 412 to one or more base stations.

For clarity, various aspects, embodiments, and features of the soft-decision power control symbol combining techniques have been described specifically for the reverse link power control in a CDMA system. The techniques described herein may also be used in other wireless communication systems in which power control commands may be sent concurrently from multiple transmitting sources to a single receiving unit. For example, these techniques may be used in other code division multiplexing (CDM)-based systems and other power-controlled systems.

The techniques described herein may also be used for the forward link power control whereby power control commands may be sent from a single transmission source to multiple receiving units.

The soft-decision power control symbol combining techniques described herein can be implemented by various means. For example, these techniques can be implemented with hardware, software, or a combination thereof. For a hardware implementation, the elements used derive the power control decisions can be implemented within one or more application specific integrated circuits (ASICs), digital signal processors (DSPs), digital signal processing devices (DSPDs), programmable logic devices (PLDs), controllers, micro-controllers, microprocessors, other electronic units designed to perform the functions described herein, or a combination thereof.

For a software implementation, the elements used to derive the power control decisions can be implemented with modules (e.g., procedures, functions, and so on) that perform the functions described herein. The software code can be stored in a memory unit (e.g., memory unit 432) and executed by a processor (e.g., power control processor 430 in FIG. 4). The memory unit may be implemented within the processor or external to the processor, in which case it can be communicatively coupled to the processor via various means as it known in the art.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a wireless communication system, a method for deriving power control decisions, comprising:
   processing a received signal to derive soft-decision symbols for power control commands transmitted from a plurality of transmission sources;

combining the soft-decision symbols for each power control period based on a particular combination scheme to provide a metric for the power control period; and deriving a power control decision from each metric, wherein the soft-decision symbols for each power control period are combined in a manner to approximate an a posteriori probability that the plurality of transmission sources transmitted UP commands given the soft-decision symbols derived for the power control period.

2. The method of claim 1, wherein the combining includes scaling each soft-decision symbol for each transmission source based on a scaling factor associated with the transmission source, and combining the scaled soft-decision symbols for each power control period to provide the metric for the power control period.

3. The method of claim 1, further comprising:

comparing each metric against a particular threshold, and wherein the power control decision is derived based on a result of the comparing.

4. The method of claim 1, further comprising:

adjusting transmit power for a data transmission to the plurality of transmission sources based on the power control decision.

5. The method of claim 1, wherein the wireless communication system is a CDMA system that supports IS-95, cdma2000, or W-CDMA standard.

6. The method of claim 1, wherein the transmission sources are base stations in a CDMA system.

7. The method of claim 6, wherein the base stations ate in an active set of a terminal operating in soft-handoff.

8. In a wireless communication system, a method for deriving power control decisions, comprising:

processing a received signal to derive soft-decision symbols for power control commands transmitted from a plurality of transmission sources;

combining the soft-decision symbols for each power control period based on a particular combination scheme to provide a metric for the power control period;

comparing each metric against a particular threshold, wherein the threshold is a function of a particular number of transmission sources for which the loft-decision symbols are combined for the power control period; and deriving a power control decision from each metric, wherein the power control decision is derived based on a result of the comparing.

9. In a wireless communication system, a method for deriving power control decisions, comprising:

processing a received signal to derive soft-decision symbols for power control commands transmitted from a plurality of transmission sources;

scaling each soft-decision symbol for each transmission source based on a scaling factor associated with the transmission source;

deriving a log domain representation for each scaled soft-decision symbol, combining the log domain representations for each power control period to derive a metric for the power control; and deriving a power control decision from each metric.

10. The method of claim 9, wherein the log domain representation for each scaled soft-decision symbol is a log-likelihood ratio (LLR).

11. The method of claim 9, wherein the sealing factor for each transmission source is related to a quality of the soft-decision symbols for the transmission source.

12. The method of claim 11, wherein the quality of the soft-decision symbols for each transmission source is estimated based on a pilot received from the transmission source.

13. In a CDMA communication system, a method for deriving power control decisions for a reverse link transmission, comprising:

processing a received signal to derive soft-decision symbols for power control commands transmitted from a plurality of base stations;

scaling each soft-decision symbol for each base station based on a scaling factor associated with the base station;

combining the scaled soft-decision symbols for each power control period to provide a metric for the power control period;

comparing each metric against a particular threshold; and deriving a power control decision for each metric based on a result of the comparing, wherein the soft-decision symbols for each power control period are combined in a manner to approximate an a posteriori probability that the plurality of base stations transmitted UP commands given the soft-decision symbols derived for the power control period.

14. In a CDMA communication system, a method for deriving power control decisions for a reverse link transmission, comprising:

processing a received signal to derive soft-decision symbols for power control commands transmitted from a plurality of base stations;

scaling each soft-decision symbol for each base station based on a scaling factor associated with the base station;

deriving a log domain representation for each scaled soft-decision symbol;

combining the log domain representations for each power control period are combined to derive a metric for the power control period;

comparing each metric against a particular threshold;

deriving a power control decision for each metric based on a result of the comparing.

15. The method of claim 14, wherein the plurality of base stations are in an active set of a terminal operating in soft-handoff.

16. A power control unit for use in a wireless communication system, comprising:

a receiver unit configured to process a received signal to provide samples;

a demodulator coupled to the receiver unit and configured to process the samples to provide soft-decision symbols for power control commands transmitted from a plurality of transmission sources; and a power control processor coupled to the demodulator and configured to combine soft-decision symbols for each power control period in a manner to approximate an a posteriori probability that the plurality of transmission sources transmitted UP commands given the soft-decision symbols derived for the power control period and based on a particular combination scheme to provide a metric for the power control period and to derive a power control decision from each metric.

17. The power control unit of claim 16, wherein the power control processor is further configured to scale each soft-decision symbol for each transmission source based on a scaling factor associated with the transmission source.

18. The power control unit of claim 17, further comprising:
   a signal quality measurement unit configured to estimate a quality of the soft-decision symbols for each transmission source, and
   wherein the scaling factor associated with each transmission source is related to the estimated quality of the soft-decision symbols for the transmission source.

19. The power control unit of claim 16, and operative on a reverse link of a CDMA system.

20. A terminal in a wireless communication system, comprising:
   a receiver unit configured to process a received signal to provide samples;
   a demodulator coupled to the receiver unit and configured to process the samples to provide soft-decision symbols for power control commands transmitted from a plurality of base stations;
   a power control processor coupled to the demodulator and configured to combine soft-decision symbols for each power control period in a manner to approximate an a posteriori probability that the plurality of transmission sources transmitted UP commands given the soft-decision symbols derived for the power control period and based on a particular combination scheme to provide a metric for the power control period and to derive a power control decision from each metric; and
   a transmitter unit configured to receive power control decisions from the power control processor and to adjust transmit power for a data transmission to the plurality of base stations based on the power control decisions.

* * * * *